United States Patent Office 3,838,104
Patented Sept. 24, 1974

---

3,838,104
NOVEL OIL- AND WATER-REPELLENT COMPOSITION OF POLYMERS OF FLUOROALKYL MONOMERS AND DIACETONE ACRYLAMIDE OR DIACETONE METHACRYLAMIDE
Takao Hayashi and Hiroaki Kojima, Yokohama, Japan, assignors to Asahi Glass Company Ltd., Tokyo, Japan
No Drawing. Filed Sept. 21, 1972, Ser. No. 290,984
Int. Cl. C08f 3/62
U.S. Cl. 260—63 HA        8 Claims

---

ABSTRACT OF THE DISCLOSURE

An oil- and water-repellent composition which comprises an oil- and water-repellent copolymer prepared by copolymerizing at least 25 weight percent of a fluoroalkyl monomer and 0.2–20 weight percent of diacetoneacrylamide, diacetonemethacrylamide or alkylol derivatives of diacetoneacrylamide or diacetonemethacrylamide.

---

BACKGROUND OF THE INVENTION

Field of the Invention

This invention relates to a novel oil- and water-repellent composition which is comprised of an oil- and water-repellent copolymer. More particularly, it relates to a novel and improved oil- and water-repellent composition which exhibits excellent oil- and water-repellency when initially impregnated in a fabric, and exhibits high durability even when heated at relatively low temperatures. The composition is prepared by copolymerizing a fluoroalkyl monomer and a specific acrylamide derivative.

Description of the Prior Art

Heretofore, oil- and water-repellent compositions have been known which contain a polymer prepared from a fluoroalkyl monomer, such as an acrylic acid ester, or a methacrylic acid ester containing a perfluoroalkyl group, or a copolymer prepared from a polymerizable fluoroalkyl monomer and a polymerizable monomer such as an acrylic ester, maleic anhydride, chloroprene, butadiene or methylvinylketone. In order to improve the durability of impregnated fabrics to washing and dry-cleaning, it has been proposed to impregnate fabrics with oil- and water-repellent copolymers prepared by copolymerizing a fluoroalkyl monomer with N-methylolacrylamide or N-methylolmethacrylamide.

However, when another monomer is copolymerized with the fluoroalkyl monomer, the initial oil- and water-repellency is usually reduced by copolymerization with the other monomer. Yet other properties of the copolymer can be improved. Even when N-methylolacrylamide or N-methylolmethacrylamide is copoylmerized with a fluoroalkyl monomer, the initial oil- and water-repellency is slightly reduced. Moreover, it has been found that the softness and hand feel of the treated fabric are reduced when it is treated with an oil- and water-repellent copolymer containing N-methylolacrylamide.

SUMMARY OF THE INVENTION

Accordingly, it is an object of this invention to provide a novel oil- and water-repellent composition comprising an oil- and water-repellent copolymer whose oil- and water-repellency characteristics in treated fabrics exhibit excellent durability when cured at relatively low temperatures. In addition, the treated fabrics do not suffer a loss in their softness quality.

This object and other objects of this invention can be attained by copolymerizing a fluoroalkyl monomer and diacetoneacrylamide, diacetonemethacrylamide or a lower alkylol derivative thereof.

DESCRIPTION OF THE PREFERRED EMBODIMENTS

When fabrics are impregnated with the oil- and water-repellent composition of this invention, they exhibit an excellent, initial oil- and water-repellency as well as an excellent durability to washing and dry-cleaning. In addition, the softness and hand feel qualities of the treated fabrics are not reduced by the treatment. The term "initial oil- and water-repellency" refers to the repellency immediately after application of the composition to fabrics.

When the copolymer of this invention is prepared by copolymerizing a fluoroalkyl monomer and diacetoneacrylamide or diacetonemethacrylamide, the durability of fabrics treated with the copolymer to washing and dry-cleaning is satisfactory when cured at relatively high temperatures. However, when a lower alkylol (—$CH_2OR$) derivative of diacetoneacrylamide or diacetonemethacrylamide (wherein R represents hydrogen or a lower alkyl group) is used instead of diacetoneacrylamide or diacetonemethacrylamide, the durability of fabrics treated with the copolymer to washing and dry-cleaning is satisfactory when cured at relatively low temperatures, e.g., lower than 140° C.

In the preparation of the copolymer according to this invention, diacetoneacrylamide, diacetonemethacrylamide or a derivative thereof (hereinafter referred to as specific acrylamide derivatives) do not appreciably affect the reaction rate. Therefore, most any type and quantity of the fluoroalkyl monomers and the acrylamide derivatives may be used.

When the amount of the specific acrylamide derivatives used in the copolymers is too great, the oil- and water-repellency of the treated fabrics are reduced. Accordingly, less than 15 weight percent of an acrylamide derivative to the total monomers is usually used. If the amount of the specific acrylamide derivatives employed is less than 0.1 weight percent of the total monomer content, the durability of the resulting copolymer is insufficient. When 0.2–20 weight percent of a specific acrylamide derivative is copolymerized with a fluoroalkyl monomer, a sufficient initial oil- and water-repellency, durability and softness can be imparted to the treated fabrics.

The specific acrylamide derivatives used in this invention can be diacetoneacrylamide, diacetonemethacrylamide, alkylol (—$CH_2OR$) diacetoneacrylamide and alkylol diacetonemethacrylamide where R is a hydrogen atom or a methyl, ethyl, propyl or butyl group. From the standpoint of commercial availability and effectiveness, methylol diacetoneacrylamide and methylol diacetonemethacrylate are the materials of choice. The fluoroalkyl monomers of this invention can be any of the conventional monomers useful in this copolymerization, and include unsaturated esters such as the acrylates and methacrylates containing $C_{3-15}$ perfluoroalkyl groups. Suitable monomers include:

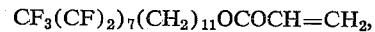

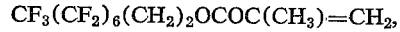

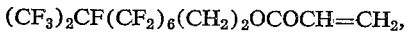

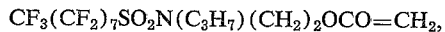

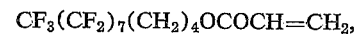

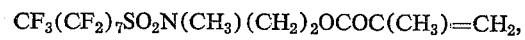

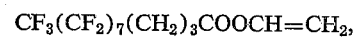

$(CF_3)_2CF(CF_2)_6CH_2CH(OH)CH_2OCOCH=CH_2$, $(CF_3)_2CF(CF_2)_6CH_2CH(OCOCH_3)OCOC(CH_3)=CH_2$

Other suitable fluoroalkylmonomers include:

$CF_2ClCF_3CF(CF_2)_7CONHCOOCH=CH_2$, $H(CF_2)_{10}CH_2OCOCH=CH_3$, $CF_2Cl(CF_2)_{10}CH_2OCOC(CH_3)=CH_2$.

Monomers containing a perfluoroalkyl group are preferably used, although other fluoroalkyl monomers copolymerizable with the specific acrylamide derivatives may also be used. In the synthesis of the copolymers, the ratio of fluoroalkyl monomer to the total monomer content is at least 25 weight percent, preferably 40 weight percent. Other types of monomers containing no fluoroalkyl groups may also be copolymerized with the specific acrylamide derivatives of this invention. Suitable monomers include ethylene, vinylacetate, vinylfluoride, vinylidenehalide, acrylonitrile, styrene, α-methylstyrene, p-methylstyrene, acrylic acid, alkyl acrylate, methacrylic acid, alkyl methacrylate, acrylamide, methacrylamide, diacetone acrylamide, methyloldiacetoneacrylamide, vinylalkylethers, vinylalkylketones, butadiene, isoprene, chloroprene, glycidyl acrylate, maleic anhydride, and mixtures thereof. When the nonfluoroalkyl containing monomers of this invention are used in the copolymerization, other properties of the product copolymer, such as dry-cleaning resistance, washing resistance, solubility, hardness, hand feel and the like, in addition to oil- and water-repellency and stain-repellency, are improved. Importantly, economical copolymers are prepared by the process of this invention. Studies have shown that when vinylchloride is copolymerized with a fluoroalkyl monomer and a specific acrylamide derivative, water-repellency can be improved without a reduction in the other characteristics of the copolymers such as oil-repellency.

Conventional oil- and water-repellent compositions exhibit satisfactory oil-repellency, but do not exhibit a satisfactory water-repellency. In order to improve the water-repellency of these compositions, water-repellent pyridinium salts and paraffin waxes have been added to the copolymers. In this invention, the durability, softness and hand feel of the copolymers are not reduced when vinylchloride is used in limited amounts. In accordance with this invention, oil- and water-repellent copolymers having excellent initial oil- and water-repellency, durability, softness and the like are prepared when at least 40 weight percent of a fluoroalkyl monomer, 0.2–20 weight percent of diacetoneacrylamide, diacetonemethacrylamide or a

—$CH_2OR$ derivative thereof, and 5–40 weight percent vinylchloride are copolymerized. In view of commercial uses and availability, esters of methacrylic acid or acrylic acid are preferably used which contain perfluoroalkyl groups and have the formula:

$R_fR'OCOCR_2=CH_2$ wherein $R_f$ represents a straight or branched chain perfluoroalkyl group containing $C_{3-15}$ carbon atoms; R' represents a straight or branched chain alkylene group containing $C_{1-10}$ carbon atoms; and $R_2$ represents a hydrogen atom or a methyl group.

Various types and conditions of polymerization reactions can be selected in order to prepare the copolymers of this invention. Any of the bulk polymerization, solution polymerization, suspension polymerization, emulsion polymerization, radiation polymerization and photopolymerization reactions can be employed. For example, a mixture of the monomers can be emulsified in water in the presence of a surface active agent and copolymerized with stirring. Suitable polymerization initiators can be used in the polymerization reaction, such as benzoyl peroxide, lauroyl peroxide, t-butyl perbenzoate, 1-hydroxy cyclohexyl hydroperoxide, 3-carboxypropionyl peroxide, acetylperoxide, azobisisobutylamidine dihydrochloride, azobisisobutyronitrile, sodium peroxide, potassium persulfate and ammonium persulfate. Ionizing radiation such as γ-rays can also be used to initiate the reactions. Surface active agents include various types of anionic, cationic and nonionic emulsifiers. Suitable anionic emulsifiers include sodium $C_{16-18}$ alkenyl sulfate acetate, sodium oleate, sodium oleate methylsulfate, ammonium ω-H-polyfluoroalkanoate containing 8–10 carbon atoms, ammonium fluoroalkanoate, sodium $C_{10-18}$ alkylsulfate, sodium $C_{12-18}$ alkylbenzenesulfonate and sodium alkylnaphthalenesulfonate. Suitable cationic emulsifiers include dodecylmethylbenzyl trimethyl ammonium chloride, benzyl dodecyl dimethyl ammonium chloride, N-[2-(diethylamino)ethyl]-oleylamide hydrochloride, dodecyl trimethyl ammonium acetate, trimethyl tetradecyl ammonium chloride, hexadecyl trimethyl ammonium chloride and trimethyl octadecyl ammonium chloride. Suitable nonionic emulsifiers include polyoxyethylene hexylphenol, isooctylphenol, nonylphenol and higher $C_{12-18}$ fatty alcohol ethers, higher polyoxyethylene $C_{12-18}$ fatty acid esters, polyoxyethylene $C_{12-16}$ alkanethiols, polyoxyethylene $C_{12-18}$ alkylamines, and polyoxyethylene sorbitane alkanoate.

The monomers may be dissolved in a suitable organic solvent, and a solution-polymerization reaction is conducted in the presence of a polymerization initiator such as a solvent soluble peroxide, azo compound or ionizing radiation. Suitable organic solvents for the solution polymerization include tetrachlorodifluoroethane, methylchloroform and the like. Aerosol type, organic solvent type or latex type oil- and water-repellent compositions of this invention can be directly prepared by solution polymerization or emulsion polymerization. The oil- and water-repellent compositions containing the copolymers of this invention can be prepared as emulsions, solutions, aerosols, and the like by conventional methods. For example, an aqueous emulsion composition can be directly prepared by an emulsion polymerization method, and a solvent solution composition can be directly prepared by a solution polymerization method. Solution type compositions can also be prepared by dissolving the copolymer prepared by a bulk polymerization method or an emulsion polymerization method in a suitable organic solvent such as acetone, methylethylketone, diethyl ether, methylchloroform, trichloroethylene, tetrachloroethylene, chlorofluorohydrocarbons, e.g., tetrachlorodifluoroethane, trichlorotrifluoroethane, or mixtures thereof. Aerosol type compositions can be prepared by packing the solution with a propellant such as dichlorodifluoromethane, monofluorotrichloromethane, dichlorotetrafluoroethane, and the like in a container.

The oil- and water-repellent compositions of this invention can be applied by various methods depending upon the form of the composition and the type of articles treated. For example, when the composition is an aqueous emulsion or a solution composition, the composition is coated on the surface of an article by a conventional dip coating method or any other coating method and dried. If necessary, certain cross-linking agents are added to cure the copolymers. If the oil- and water-repellent composition is used as an aerosol, it may be sprayed on an article and dried leaving a satisfactory oil-, water-, and stain-repellent article.

It is possible to apply the oil- and water-repellent compositions of this invention together with other water-repellent compositions and oil-repellent compositions containing insecticides, flameproofing agents, antistatic agents, dye fixing agents, shrink-proofing agents, and the like. The types of articles treated by the oil- and water-repellent compositions of this invention are not limited, and can be fibrous fabrics, glass, paper, wood, leather, wool, asbestos, brick, cement, metal, metal oxides, ceramics, plastics, coating surfaces, and plaster. The fibrous fabric can be made of natural fibers such as cotton, hemp, wool, silk;

synthetic fibers such as polyamides, polyesters, polyvinyl-alcohols, polyacrylonitriles, polyvinylchlorides, polypropolyenes, polytetrafluoroethylenes, semi-synthetic fibers such as rayon, acetate and glass fiber; and mixtures thereof.

Having generally described the invention, a more complete understanding can be obtained by reference to certain specific examples, whch are included herein for purposes of illustration only and are not intended to be limiting unless otherwise specified.

In the examples, water-repellency and oil-repellency are shown by the following standards. Water-repellency is measured by the ASTM D–583–63 spray method and is placed on a scale as shown in Table I. Oil-repellency of the composition is measured by the falling drop method in n-heptane and Nujol and mixtures thereof in the ratios shown in Table II. The drop is observed over a period of 3 minutes, and the results are placed on a scale as shown in Table II.

TABLE I

| Water-repellency: | Condition |
|---|---|
| 100 | No wetting of the surface. |
| 90 | Small wetting of the surface. |
| 80 | Visible wetting of the surface. |
| 70 | Partial wetting of the surface. |
| 50 | Full wetting of the surface. |
| 0 | Complete wetting of both surfaces. |

TABLE II

| | Composition | |
|---|---|---|
| | n-Heptane (percent vol.) | Nujol (percent vol.) |
| Oil-repellency: | | |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% Nujol is not held | |

In the following examples, the + symbol next to some numbers indicates a number higher than the base numbers.

The durability tests were conducted as follows:

In the dry-cleaning test, a fabric treated with the oil- and water-repellent copolymer was stirred in a solution of 1.0% by weight or by volume of a detergent in tetrachloroethylene at 20° C. for 30 minutes, and was dried.

In the washing test, a treated fabric was stirred in a solution of 0.3% by weight or by volume of a detergent in water at 40° C. for 7 minutes, washed with water at a flow of 600 l./hr. for 15 minutes, and was dried. Washing of the fabric was conducted in a home electric washing machine. Durability, i.e., washing resistance and dry-cleaning resistance, is indicated by the degree of oil- and water-repellency after one and after five washings or dry-cleanings.

The softness tests were conducted as follows:

The stiffness of the untreated fabrics and the treated fabrics were measured by the Japan Industrial Standard L–1079 slide method wherein a test fabric 15 cm. in length and 2 cm. in width was used, and the bending moment at a length of 5 cm. was measured. The degree of softness was calculated by the following expression:

$$\text{Softness} = \frac{\text{Stiffness of untreated fabric}}{\text{Stiffness of treated fabric}}$$

Lower values show a higher softness, and the softness of an untreated fabric is assigned a value of one. Hand feel measurements are indicated by three words wherein "excellent" means the feel of the treated fabric has the same hand feel as the untreated fabric, and "good" means that the feel of the treated fabric is a rather stiff feeling, and "not good" means that the feel of the treated fabric is quite stiff.

EXAMPLE 1

In this Example, a typical solution polymerization method for preparing a copolymer of this invention, is illustrated by the copolymerization of a fluoroalkyl monomer with vinylchloride and methylol diacetoneacrylamide. In a 2 liter autoclave made of stainless steel (SUS–27) equipped with a thermostat and an electromagnetic stirrer, 288 g. of a mixture of compounds having the formula: $CF_3(CF_2)_nCH_2CH_2OCOCH=CH_2$ (wherein the ratio of compounds having values of $n=5$, 7, 9 and 11 is 4:3:2:0.5), 8 g. of methylol diacetoneacrylamide, 900 g. of acetone and 4 g. of azobis-isobutyronitrile were charged. The mixture was flushed by bubbling nitrogen gas for about 20 minutes through the mixture to remove all of the oxygen present in the mixture. A 100 g. quantity of vinylchloride (99.9% pure) was added to the autoclave under pressure, and the temperature of the autoclave was gradually raised. The mixture was copolymerized at 60° C. for 15 hours with stirring.

The conversion of the copolymer based on the fluoroalkyl monomer was 99%. According to an elementary analysis of the product, the analyzed value for fluorine was 46.5% while the calculated value for fluorine was 45.1%. The inherent viscosity of the copolymer in 0.50 g./100 ml. of benzotrifluoride at 30° C. was 0.43.

EXAMPLE 2

In this example, a typical emulsion polymerization method for preparing a copolymer of this invention is illustrated by the copolymerization of a fluoroalkyl monomer with vinylchloride and methylol diacetonemethacrylamide.

In the autoclave of Example 1, 274 g. of a mixture of compounds having the formula:

$$(CF_3)_2CF(CF_2)_nCH_2CH_2OCOCH=CH_2$$

(wherein the ratio of compounds having values of $n=4$, 6, 8 and 10 is 4:3:2:1 by weight), 9 g. of methylol diacetonemethacrylamide, 1050 g. of deoxygenated water, 315 g. of acetone, 0.4 g. of n-hexadecyl-mercaptan, 1.6 g. of azobis-isobutylamidine, 2 hydrochloride and 17 g. of $C_{17}H_{33}COO(CH_2CH_2O)_3OH$ were charged. The mixture stirred under a nitrogen gas flow so as to emulsify and to disperse the mixture. After flushing the mixture by bubbling nitrogen gas through it for about 0.5 hour, 90 g. of vinylchloride was charged into the autoclave from a small size bomb. The temperature of the autoclave was gradually raised with stirring, and the monomers were copolymerized at 55° C. for 12 hours. According to gas chromatographic analysis, the conversion based on the fluoroalkyl monomer was 99.5%.

The resulting stable emulsion latex contained 19.9% of the copolymer. According to an elementary analysis of the product, the analyzed value for fluorine was 42.9% while the calculated value for fluorine was 44.3%. The inherent viscosity of the copolymer in 0.50 g./100 ml. of benzotrifluoride at 30° C. was 0.69.

EXAMPLE 3 AND REFERENCES 1–3

A wool fabric and a cotton 65%-polyester 35% fabric were used as test fabrics. The oil- and water-repellent compositions containing the copolymer of this invention or another copolymer were respectively diluted with water to prepare emulsions containing 0.4 weight percent of a copolymer. Each test fabric was dipped in an emulsion for one minute and was squeezed between two rubber rollers until 80% saturated. The treated fabrics were dried at 100° C. for 3 minutes and then heated at 130° C. for 3 minutes. The initial oil- and water-repellency, softness and hand feel of the treated fabrics were measured, and the results are shown in Table III. For the the durability test, the oil- and water-repellency of the fabrics was measured after cleaning and washing, and the results are shown in Table IV.

In the Tables, FA represents $$CH_2=CHCOOCH_2CH_2(CF_2)_nCF_3$$

(wherein the ratio of compounds having values of $n=5$, 7, 9 and 11 is 4:3:2:0.5);
N–MAM represents N-methylol acrylamide;
DAAM represents $CH_2=CHCONHC(CH_3)_2CH_2COCH_3$ (diacetoneacrylamide);
MDAAM represents methylol diacetoneacrylamide;
VC represents vinylchloride;
W represents a wool fabric; and
C/E represents Cotton 65%-Polyester 35% fabric.

TABLE III

| | Oil- and water-repellent copolymer (ratio of monomers percent) | Test fabric | Initial values | | Soft-ness | Hand fell |
|---|---|---|---|---|---|---|
| | | | Oil-repellency | Water-repellency | | |
| Example 3 | FA/VC/MDAAM (73/25/2) | W<br>C/E | 130<br>120 | 100<br>100 | 0.99<br>1.00 | Excellent. |
| Reference: | | | | | | |
| 1 | FA/VC/DAAM (73/25/2) | W<br>C/E | 130<br>110+ | 90+<br>90+ | 0.98<br>1.01 | Good. |
| 2 | FA/VC/N-MAM (73/25/2) | W<br>C/E | 130<br>120 | 100<br>90+ | 0.80<br>0.85 | Not good. |
| 3 | FA/VC (75/25) | W<br>C/E | 120<br>110 | 90<br>90 | 0.97<br>0.99 | Fair. |

TABLE IV

| | Test fabric | Washing resistance (after 5 washings) | | Dry-cleaning resistance (after 5 cleanings) | |
|---|---|---|---|---|---|
| | | Oil-repellency | Water-repellency | Oil-repellency | Water-repellency |
| Example 3 | W<br>C/E | 100<br>100 | 80<br>70 | 100<br>100 | 90<br>80 |
| Reference: | | | | | |
| 1 | W<br>C/E | 80<br>70 | 50<br>50 | 90<br>90 | 70<br>70 |
| 2 | W<br>C/E | 90<br>80 | 70<br>50 | 100<br>90 | 80<br>70 |
| 3 | W<br>C/E | 60<br>50 | 0<br>0 | 80<br>70 | 70<br>50 |

EXAMPLES 4–8 AND REFERENCE 4

A polyester fabric was used as the test fabric. The oil- and water-repellent compositions containing the copolymer of this invention or another copolymer were respectively diluted with water to prepare emulsions containing 0.2 weight percent of a copolymer. Each test fabric was dipped in an emulsion for one minute and was squeezed between two rubber rollers until 75% saturated. The treated fabrics were dried at 100° C. for 3 minutes and then heated at 180° C. for 1.5 minutes. The initial oil- and water-repellency and the repellency after dry-cleaning and after washing were measured, and the results are shown in Tables V and VI.

TABLE V

| | Oil- and water-repellent copolymer (ratio of monomers percent) | Initial values | |
|---|---|---|---|
| | | Oil-repellency | Water-repellency |
| Example: | | | |
| 4 | FA/VC/MDAAM (74.5/25/0.5) | 120 | 100 |
| 5 | FA/VC/MDAAM (74/25/1) | 120 | 100 |
| 6 | FA/VC/MDAAM (72/25/3) | 120+ | 100 |
| 7 | FA/VC/MDAAM (71/24/5) | 120+ | 100 |
| 8 | FA/VC/MDAAM (70/22/8) | 120 | 90+ |
| Reference 4 | FA/VC (75/25) | 110 | 90 |

TABLE VI

| | Washing resistance (after 5 washings) | | Dry-cleaning resistance (after 5 cleanings) | |
|---|---|---|---|---|
| | Oil-repellency | Water-repellency | Oil-repellency | Water-repellency |
| Example: | | | | |
| 4 | 90 | 70 | 100 | 90 |
| 5 | 100 | 70 | 100 | 90 |
| 6 | 100 | 80 | 110 | 90+ |
| 7 | 100 | 80 | 110 | 90+ |
| 8 | 110 | 70 | 110 | 90 |
| Reference 4 | 70 | 0 | 80 | 50 |

EXAMPLES 9–12 AND REFERENCES 5, 6

A wool fabric was treated with the oil- and water-repellent compositions containing the copolymers shown in Table VII, in accordance with the process of Example 3. The initial oil- and water-repellency and the repellency after dry-cleaning and after washing were measured and the results are shown in Table VII.

TABLE VII

| | Oil- and water-repellent copolymer (ratio of monomers percent) | Initial values | | After 5 dry-cleaning cycles | |
|---|---|---|---|---|---|
| | | Oil-repellency | Water-repellency | Oil-repellency | Water repellency |
| Example: | | | | | |
| 9 | FA/EA/MDAAM (80/18/2) | 140 | 90 | 110 | 80 |
| 10 | FA/BMA/MDAAM (75/23/2) | 130 | 90 | 120 | 80+ |
| 11 | FA/EHMA/MDAAM (75/23/2) | 130 | 90+ | 110 | 90 |
| 12 | FA/St/MDAAM (85/13/2) | 120 | 100 | 110 | 90 |
| Reference: | | | | | |
| 5 | FA/BMA (75/25) | 120 | 90 | 90 | 50 |
| 6 | FA/St (85/15) | 110 | 90+ | 70 | 50 |

NOTE.—EA=ethylacrylate; BMA=butylmethacrylate; EHMA=2-ethylhexylmethacrylate; St=styrene.

EXAMPLE 13

In this example, a typical solution polymerization method for preparing a copolymer of this invention is illustrated by the copolymerization of a fluoroalkyl monomer with vinylchloride and diacetoneacrylamide. In the autoclave of Example 1, 288 g. of a mixture of compounds having the formula: $CF_3(CF_2)_nCH_2CH_2OCOCH=CH_2$ (wherein the ratio of compounds having values of $n=5$, 7, 9 and 11 is 4:3:2:0.5), 12 g. of diacetoneacrylamide, 900 g. of methylchloroform and 4 g. of azobis-isobutyronitrile were charged. The mixture was flushed by bubbling nitrogen gas for about 20 minutes through the mixture to remove all of the oxygen present in the mixture. A 100 g. quantity of vinylchloride (99.9% pure) was added to the autoclave under pressure, and the temperature of the autoclave was gradually raised. The monomers were copolymerized at 70° C. for 15 hours with stirring.

The conversion of the copolymer based on the fluoroalkyl monomer was 99%. According to an elementary analysis of the product, the analyzed value for fluorine was 46.5% while the calculated value for fluorine was 45.1%. The inherent viscosity of the copolymer in 0.50 g./100 ml. of benzotrifluoride at 30° C. was 0.43.

EXAMPLE 14

In this example, a copolymer from the copolymerization of a fluoroalkyl monomer with vinylchloride and diacetonemethacrylamide was prepared by an emulsion polymerization method in accordance with Example 2 except that 9 g. of methylol-diacetonemethacrylamide was replaced by 16 g. of diacetonemethacrylamide. According to a gas chromatographic analysis, the conversion based on the fluoroalkyl monomer was 99.5%. The resulting stable emulsion latex contained 19.8% of the copolymer. According to an elementary analysis of the product, the analyzed value for fluorine was 43.7% while the calculated value for fluorine was 44.3%. The inherent viscosity of the copolymer in 0.50 g./100 ml. of benzotrifluoride at 30° C. was 0.75.

EXAMPLES 15–18 AND REFERENCES 7–9

The oil-and water-repellent compositions containing the copolymer of this invention or another copolymer were respectively diluted with water to prepare emulsions containing 1.0 weight percent of a copolymer. Each test fabric was dipped in an emulsion for one minute and was squeezed between two rollers until 80% saturated. The treated fabrics were dried at 100° C. for 3 minutes and then heated at 150° C. for 4 minutes. The initial oil- and water-repellency, the repellency after dry-cleaning and after washing, the softness and the hand feel of the treated fabrics were measured, and the results are shown in Tables VIII and IX.

TABLE VIII

| | Oil- and water-repellent copolymer (ratio of monomers percent) | Test fabric | Initial values | | Softness | Hand feel |
|---|---|---|---|---|---|---|
| | | | Oil-repellency | Water-repellency | | |
| Example: | | | | | | |
| 15 | FA/VC/DAAM (73/25/2) | C | 120 | 100 | 1.00 | Excellent. |
| | | C/E | 120 | 100 | 1.01 | |
| 16 | FA/VC/DAAM (71.5/25/3.5) | C | 120 | 100 | 1.02 | Do. |
| | | C/E | 120 | 100 | 1.00 | |
| 17 | FA/VC/DAAM (70/25/5) | C | 120 | 90 | 1.01 | Do. |
| | | C/E | 120 | 90+ | 0.99 | |
| 18 | FA/VC/DAAM (67/25/8) | C | 110 | 80 | 0.98 | Do. |
| | | C/E | 120 | 80+ | 0.97 | |
| Reference: | | | | | | |
| 7 | FA/VC (75/25) | C | 110 | 90 | 0.99 | Fair. |
| | | C/E | 110 | 90+ | 0.98 | |
| 8 | Commercial A | C | 100 | 80 | 0.82 | Not good. |
| | | C/E | 120 | 100 | 0.85 | |
| 9 | Commercial B | C | 90 | 90 | 1.03 | Excellent. |
| | | C/E | 110 | 100 | 1.05 | |

NOTE.—DAAM represents $CH_2=CHCONHC(CH_3)_2CH_2COCH_3$ (diacetoneacrylamide)
C represents a cotton fabric.

TABLE IX

| | Test fabric | Washing resistance | | | | Dry-cleaning resistance | | | |
|---|---|---|---|---|---|---|---|---|---|
| | | After 1 washing | | After 5 washings | | After 1 cleaning | | After 5 cleanings | |
| | | Oil-repellency | Water-repellency | Oil-repellency | Water-repellency | Oil-repellency | Water-repellency | Oil-repellency | Water-repellency |
| Example: | | | | | | | | | |
| 15 | C | 90 | 80 | 70 | 50 | 110 | 80 | 100 | 70 |
| | C/E | 100 | 80+ | 80 | 70 | 120 | 90 | 110 | 80 |
| 16 | C | 100 | 80 | 70 | 70 | 110 | 80 | 110 | 70 |
| | C/E | 110 | 80+ | 90 | 70 | 130 | 90 | 120 | 80 |
| 17 | C | 100 | 80 | 70 | 70 | 110 | 80 | 100 | 70 |
| | C/E | 100 | 80 | 90 | 70 | 120 | 80+ | 120 | 70 |
| 18 | C | 100 | 70 | 80 | 50 | 110 | 70 | 110 | 50 |
| | C/E | 110 | 70 | 100 | 50 | 120 | 80 | 120 | 70 |
| Reference: | | | | | | | | | |
| 7 | C | 80 | 70 | 50 | 0 | 90 | 70 | 70 | 50 |
| | C/E | 100 | 80 | 60 | 0 | 100 | 70 | 80 | 50 |
| 8 | C | 50 | 70 | 0 | 60 | 110 | 70 | 90 | 70 |
| | C/E | 60 | 70 | 0 | 60 | 120 | 70 | 110 | 70 |
| 9 | C | 90 | 70 | 70 | 50 | 80 | 70 | 50 | 50 |
| | C/E | 100 | 70 | 90 | 70 | 90 | 70 | 80 | 50 |

EXAMPLE 19

In accordance with Example 2, an emulsion polymerization was conducted with 3 g. of $$CF_3(CF_2)_7CH_2CH_2OCOC(CH_3)=CH_2$$

2.5 g. of vinylchloride and 0.2 g. of diacetoneacrylamide in a 100 ml. glass ampoule in a constant temperature bath at 55° C. for 12 hours. The resulting emulsion consisting of 20.1 weight percent of the copolymer was diluted with water until a concentration of 0.4 weight percent of the copolymer in solution was reached. A polyester fabric was dipped in the diluted emulsion, and was squeezed between two rubber rollers until 70% saturated. The treated fabric was dried at 100° C. for 3 minutes, and then heated at 150° C. for 4 minutes. The treated fabric had a water-repellency of 100 and an oil-repellency of 130. After 5 dry-cleaning treatments, the fabric had a water-repellency of 80 and an oil-repellency of 100. The softness was 1.01.

EXAMPLES 20, 21 AND REFERENCE 10

In accordance with Example 19, an emulsion polymerization was conducted using FA and/or diacetoneacrylamide. The resulting emulsions had a high transparency and were stable. In accordance with Example 19, a polyester fabric (E) or a cotton 35%-polyester 65% fabric were treated with a dilute emulsion solution containing 0.5 weight percent copolymer. The initial oil- and water-repellency, the repellency after 5 washings and after 5 dry-cleanings, the softness and the hand feel of the treated fabrics were measured and the results are shown in Tables X and XI.

TABLE X

| | Oil-and water repellent copolymer (ratio of monomers percent) | Test fabric | Initial values | | Softness | Hand feel |
|---|---|---|---|---|---|---|
| | | | Oil-repel-ency | Water-repel-ency | | |
| Example: | | | | | | |
| 20 | FA/DAAM (98/2) | E O/E | 130 120 | 90+ 90 | 1.00 0.98 | Excellent |
| 21 | FA/DAAM (95/5) | E C/E | 130 120 | 100 100 | 1.02 1.01 | Do. |
| Reference 10 | FA (100) | E C/E | 100 80 | 70 0 | 0.99 0.97 | Do. |

TABLE XI

| | Test fabric | Washing resistance (after 5 washings) | | Dry-cleaning resistance (after 5 cleanings) | |
|---|---|---|---|---|---|
| | | Oil-repellency | Water-repellency | Oil-repellency | Water-repellency |
| Example: 20 | E C/E | 100 80 | 80 70 | 120 110 | 80 80 |
| 21 | E C/E | 90+ 90 | 80+ 80 | 120 120 | 90 80 |
| Reference 10 | E C/E | 70 50 | 0 0 | 80 70 | 50 0 |

EXAMPLE 22

In a 10 ml. glass ampoule, 5.7 g. of $$C_8F_{17}SO_2N(C_2H_5)CH_2CH_2OCOC(CH_3)=CH_2,$$

4.0 g. of chloroprene, 0.3 g. of diacetoneacrylamide, 0.02 g. of azobis-isobutylamidine 2 hydrochloride, 0.5 g. of $C_{18}H_5O(CH_2CH_2O)_{30}H$ were charged and purged with nitrogen gas. The ampoule was sealed and was agitated in a constant temperature bath as 55° C. After 10 minutes, the initiation of the polymerization reaction was indicated by a change to a milk-white color. After agitating the ampoule for 6 hours, the resulting stable emulsion latex was diluted with water to a concentration of 0.3 weight percent copolymer.

In accordance with Example 19, a polyester fabric was treated with the diluted emulsion. The treated polyester fabric had an oil-repellency of 110 and a water-repellency of 100 and had an excellent hand feel. After 5 dry-cleaning treatments, the fabric had an oil-repellency of 100 and a water-repellency of 80.

EXAMPLE 23

In this example, the oil- and water-repellent composition prepared by a solution polymerization reaction was aplied as a solution. A 75 g. quantity of $$\begin{array}{c}CF_3\\ \phantom{CF}\diagdown\\ CF(CF_2CF_2)_3CH_2CH_2OCOCH=CH_2\\ \phantom{CF}\diagup\\ CF_3\end{array}$$

20 g. of vinylchloride, 3 g. of diacetoneacrylamide, 2 g. of chloroethylvinylether were copolymerized in accordance with the procedure of Example 13. A 2 g. amount of the copolymer was dissolved in a solvent consisting of 30 weight percent trichlorotrifluoroethane and 70 weight percent methylchloroform to prepare a 1 weight percent solution of the copolymer. A wool fabric was dipped in the solution for 30 seconds and was sqeezed and dried at room temperature. The treated wool fabric had an oil-repellency of 140, a water-repellency of 100, and a softness of 1.02. After 5 dry-cleaning treatments, the treated fabric had an oil-repellency of 90 and a water-repellency of 70.

Having now fully described the invention, it will be apparent to one of ordinary skill in the art that many changes and modifications can be made thereto without departing from the spirit or scope of the invention as set forth herein. Accordingly,

What is claimed as new and intended to be covered by Letters Patent is:

1. An oil- and water-repellent composition which comprises an oil- and water-repellent copolymer prepared by copolymerizing at least 25 weight percent based on the total weight of monomers, of a monomer selected from the group consisting of fluoroalkyl monomers having a formula $$R_fR'OCOCR_2=CH_2$$

wherein $R_f$ represents a straight or branched chain perfluoroalkyl group containing $C_{3-15}$ carbon atoms, $R'$ represents a straight or branched chain alkylene group containing $C_{1-10}$ carbon atoms, and $R_2$ represents a hydrogen atom or a methyl group, $$[(CF_3(CF_2)_7SO_2N(C_3H_7)(CH_2)_2(C)CH=CH_2],$$

$$CF_3(CF_2)_7SO_2N(C_3H_7)(CH_2)_2OCOCH=CH_2,$$

$$CF_3(CF_2)_7SO_2N(CH_3)(CH_2)_2OCOC(CH_3)=CH_2,$$

$$(CF_3)_2CF(CF_2)_6CH_2CH(OH)CH_2OCOCH=CH,$$

$$(CF_3)_2CF_2(CF)_6CH_2CH(OCOCH_3)OCOC(CH_3)=CH_2,$$

$$CF_2ClCF_3CF(CF_2)_7CONHCOOCH=CH_2,$$

$$H(CF_2)_{10}CH_2OCOCH=CH_3, \text{ and}$$

$$CF_2Cl(CF_2)_{10}CH_2OCOC(CH_3)=CH_2;$$

0.2–20 wt. percent based on the total weight of monomers, of diacetoneacrylamide, diacetonemethacrylamide or alkylol derivatives thereof, and the remainder, a non-fluoroalkyl containing copolymerizable monomer.

2. The oil- and water-repellent composition of Claim 1, wherein the alkylol derivatives of diacetoneacrylamide or diacetonemethacrylamide contain —$CH_2OR$ groups, wherein R represents a hydrogen atom or a lower alkyl group.

3. The oil- and water-repellent composition of Claim 1, wherein the non-fluoroalkyl containing copolymerizable monomer is selected from the group consisting of ethylene, vinylacetate, vinylfluoride, vinylidenehalide, acrylonitrile, styrene, α-methylstyrene, p-methylstyrene, acrylic acid, alkyl acrylate, methacrylic acid, alkyl methacrylate, acrylamide, methacrylamide, diacetone acrylamide, methyloldiacetoneacrylamide, vinylalkylethers, vinylalkylketones, butadiene, isoprene, chloroprene, glycidly acrylate, maleic anhydride, and mixtures thereof.

4. The oil- and water-repellent composition of Claim 1, wherein the fluoroalkyl monomer is present in at least 40 wt. percent, and the non-fluoroalkyl containing copolymerizable monomer is vinylchloride which is present in an amount of from 5-40 wt. percent.

5. The oil- and water-repellent composition of Claim 1, wherein the copolymer is prepared from fluoroalkyl monomers having the formula $$CH_2=CHCOOCH_2CH_2(CF_2)_nCF_3,$$

wherein the ratio of compounds having values of $n=5, 7, 9$ and $11$ is $4:3:2:0.5$, vinylidene and methyldiacetoneacrylamide.

6. The oil- and water-repellent composition of Claim 1, wherein the non-fluoroalkyl containing copolymerizable monomer is selected from the group consisting of ethylacrylate, butylmethacrylate, 2-ethylhexylmethacrylate and styrene.

7. The oil- and water-repellent composition of Claim 1, consisting essentially of the fluoroalkyl monomer and diacetoneacrylamide.

8. The oil- and water-repellent composition of Claim 5, wherein the ratio of the fluoroalkyl monomer, vinylchloride and methyloldiacetoneacrylamide is 73:25:2.

References Cited
UNITED STATES PATENTS

| | | | |
|---|---|---|---|
| 3,625,929 | 12/1971 | Stump, Jr. et al. | 260—89.5 |
| 3,428,709 | 2/1969 | Kleiner | 260—836 |
| 3,457,247 | 7/1969 | Katsushima et al. | 260—89.5 |

LESTER L. LEE, Primary Examiner

U.S. Cl. X.R.

117—124 R, 126 R, 126 AB, 132 B, 138.5, 138.8 P, 138.8 E, 138.8 F, 138.8 N, 138.8 UA, 142, 148, 155 UA, 161 UT, UN; 204—159.22; 260—29.6 F, 32.8 N, 33.4 F, 33.8 F, 63 N, 87.5 A, 89.5 H